Feb. 3, 1970   J. L. HARGROVE   3,493,965
DIGITAL TO SYNCHRO CONVERTER
Filed Nov. 3, 1966   2 Sheets-Sheet 1

INVENTOR
James L. Hargrove
BY
Weir, Marshall,
MacRae & Lamb
PATENT AGENTS

Feb. 3, 1970   J. L. HARGROVE   3,493,965
DIGITAL TO SYNCHRO CONVERTER
Filed Nov. 3, 1966   2 Sheets-Sheet 2

INVENTOR
James L. Hargrove
BY Weir, Marshall,
MacRae, & Lamb
PATENT AGENTS.

United States Patent Office 3,493,965
Patented Feb. 3, 1970

1

3,493,965
DIGITAL TO SYNCHRO CONVERTER
James L. Hargrove, 77 Evergreen Drive,
Ottawa 6, Ontario, Canada
Filed Nov. 3, 1966, Ser. No. 591,792
Int. Cl. G08c 9/00, 11/00; H04l 3/00
U.S. Cl. 340—347                             6 Claims

ABSTRACT OF THE DISCLOSURE

A system for producing synchro excitation voltages corresponding to a digital number input. A reference sine wave is sampled under the control of timing signals occurring at accurately spaced intervals and the instantaneous sampled amplitudes stored in capacitor stores. The signals in the capacitor stores are used to establish the amplitudes of the synchro excitation voltages. The timing signals are obtained from a scaler normally recycling in synchronism with the reference sine wave. When there is an input to the system, the scaler count is displaced by an amount corresponding to the digital number input which alters the time of occurrence of the timing signals and, hence, the sampled amplitudes.

---

Figure 1:
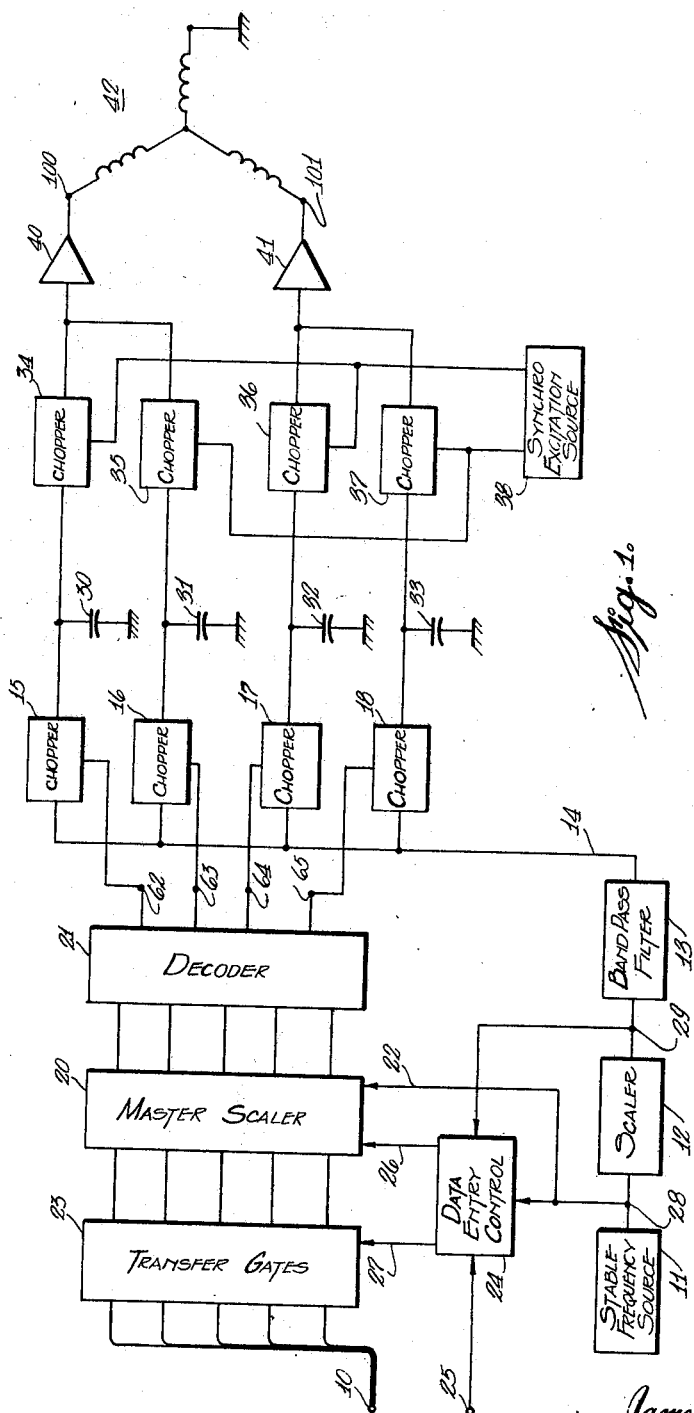

This invention relates to a novel system for controlling the angular position of a shaft in response to a digital signal. In particular, it relates to a digital to analog converter responsive to a digital number signal to provide the appropriate alternating voltages for controlling the position of the rotor shaft of a synchro or resolver.

Rotating devices responsive to analog signals are widely used in computer circuitry. Typical of such devices are synchros and resolvers having, in one form, a plurality of stator windings magnetically coupled to a rotor winding. When the stator windings of such devices are energized by alternating voltages of the same phase and having their peak amplitudes related by certain trigonometric functions the rotor shaft can be constrained to assume a position defined by these trigonometric functions. Specifically, when the stator windings of a synchro are Y connected with one terminal grounded and the peak amplitudes of the exciting voltages between the remaining terminals and ground are in the ratio sin θ:sin (θ+60) then the rotor will adopt a position corresponding to the angle θ. In a similar fashion, with a resolver having two stator windings in space quadrature peak amplitudes of the exciting voltages in the ratio sin θ:cos θ will cause the rotor to assume an angular shaft position θ.

When a rotating device stator has been energized in the manner set out above, two methods are commonly used to set the shaft position. The rotor winding may be energized by an alternating voltage of the same frequency and phase as the energizing voltages supplied to the stator windings. Motor action then causes the rotor to assume an angular position determined by the stator voltages. Alternatively, and more commonly in computing circuitry, a servo loop may be used to drive the rotor shaft to an angular position where the net voltage induced in the rotor winding by the stator windings is zero.

Systems are known for providing the appropriate alternating voltages for energizing synchro and resolver windings to obtain predetermined rotor shaft positions. Such systems generally involve the selection, by switching, of one of a number of alternating voltage sources of varying peak amplitude. The switching may be carried out by mechanical or electrical switches and the voltage sources may be formed by resistive voltage dividers or tapped transformers. Clearly, the accuracy of such systems is limited by the number of switching elements and voltage sources which may be employed.

It is an object of this invention to provide a novel system having improved accuracy for converting digital information to analog alternating signals for energizing a rotating device.

The system of this invention derives the correct amplitudes for the synchro excitation signals by sampling the instantaneous amplitudes of a reference sine wave at accurately spaced intervals. The reference sine wave is derived from a stable frequency source by a frequency division and filtering. A master scaler is also driven by the stable frequency source and is of such capacity that it completes exactly one cycle in the period of the reference sine wave. A decoding circuit produces timing signals at the instant of occurrence of predetermined counts in the scaler. Thus, if the scaler starts in synchronism with the reference sine wave and timing signals are produced at counts of 0, ⅙ capacity, ½ capacity and ⅔ capacity these timing signals will occur at instants when the amplitude of the reference sine wave is proportional to sin 0° (or 0), sin 60°, sin 180° (or 0) and sin 240° (or −sin 60°), respectively. By "synchronism" it is meant that the reference sine wave has a fixed phase relationship to the master scaler so that the reference sine wave passes through zero when the master scaler count is zero.

If, however, the scaler and reference sine wave are not in synchronism, by reason of the scaler count being displaced by an amount $n$, then the timing signals will occur at instants when the amplitude of the reference sine wave is proportional to sin θ, sin (θ+60) sin (θ+180) and sin (θ+240), where θ represents $n/N360$ and N is the scaler capacity. It will be seen that these amplitudes give the appropriate peak amplitude values for synchro excitation to set the rotor to angular position θ.

Sampling means are provided, responsive to the timing signals, to sample the amplitudes of the reference sine wave at the instants of occurrence of the timing signals. The sampled values are then stored in suitable storage means, such as capacitors. A second sampling means, controlled at a suitable frequency for synchro excitation, is responsive to the stored values to produce alternating signals having peak amplitudes proportional to the stored values. In the specific case considered above these output alternating signals would have peak values proportional to sin θ and sin (θ+60). If alternatively, the timing signals occurred at scaler counts corresponding to 0, ¼, ½ and ¾ capacity then the output alternating signals would have peak amplitudes proportional to sin θ and sin (θ+90) which are the appropriate values for exciting resolver stator windings.

Figure 2:
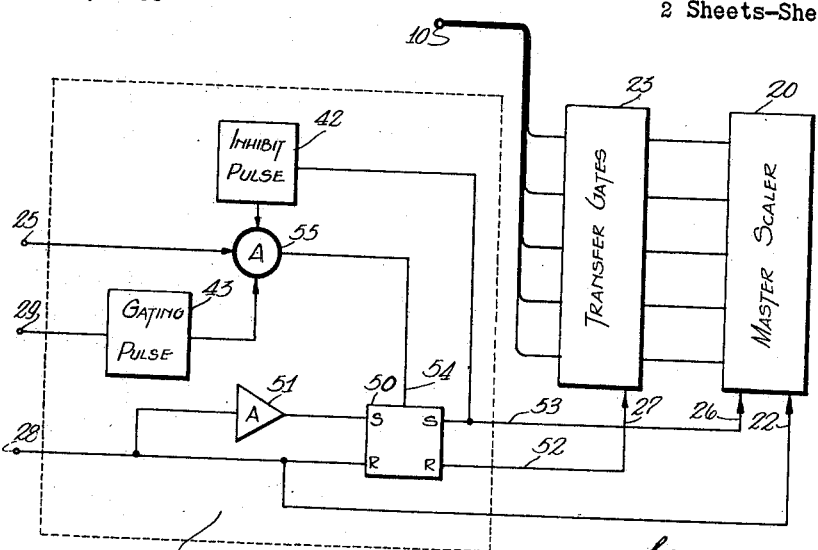
Figure 3:
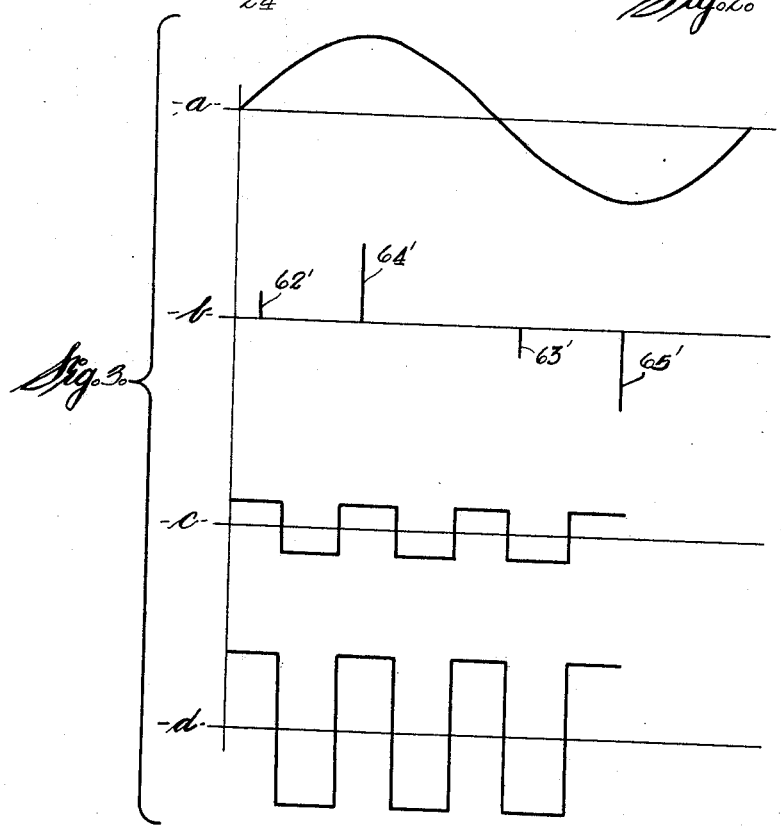

Further features of this invention will become apparent from the following description of one embodiment, taken in conjunction with the accompanying drawings, in which:

FIGURE 1 is a functional diagram of one embodiment of the system of this invention, FIGURE 2 is a block diagram of the data entry control useful in the system of FIGURE 1, and FIGURE 3 is a graphical representation of various signals occurring in the operation of the system of FIGURE 1.

Referring now to FIGURE 1, there is shown a system having a data input terminal 10 for receiving a digital number signal. The system is responsive to the information contained in this signal to produce alternating voltages at output terminals 100 and 101 having their peak amplitudes proportional to sine or cosine functions of the digital number.

The basic timing of the system is controlled by a stable frequency source 11 emitting a sequence of clock pulses at a uniform rate. A relatively low frequency sine wave is derived from frequency source 11 by means of a scaler 12 and a band pass filter 13. This reference sine wave is sampled at different instants by four chopper circuits 15 through 18 connected to the output of filter 13 by means of a conductor 14. The sampling performed by these chopper circuits is controlled by timing signals derived from a master scaler 20 and its associated circuitry.

Master scaler 20 has a counting input 22 connected to the output of stable freqeuncy source 11. A reset and carry-inhibit control 26 is also provided for use when it is desired to set the master scaler count to the number appearing at data input terminal 10. The transfer of this number to the master scaler is also controlled by a series of transfer gates 23 having an inhibit input 27. Scaler control 26 and the transfer gates inhibit input 27 are both connected to a data entry control 24. The operation and particular structure of the data entry control 24 will be described more fully below in connection with FIGURE 2, briefly, it may be said that it functions to add the digital number appearing at terminal 10 to scaler 20 at the instant when the reference sine wave is passing through zero. Three inputs are provided to the data entry control: one is connected to a terminal 25 adapted to receive a signal indicating that data is available; a second is connected to stable frequency source 11 and a third is connected to the output of scaler 12. For ease in relating FIGURE 2 to FIGURE 1 the output of source 11 has been designated as terminal 28 and the output of scaler 12 designated as terminal 29.

As has been mentioned, the chopper circuits 15 through 18 are controlled by timing signals derived from the master scaler. These timing signals are supplied by a decoder circuit 21 connected to master scaler 20. Decoder 21, which may be a conventional switching tree, has output terminals 62, 63, 64 and 65 which are individually energized at the occurrence of predetermined counts in the master scaler. Terminals 62, 63, 64 and 65 are connected to the control inputs of choppers 15, 16, 17 and 18, respectively, so that on the occurrence of a predetermined count in the scaler the corresponding chopper is actuated. Storage capacitors 30 through 33 are provided each having one plate grounded. The outputs of choppers 15, 16, 17 and 18 are connected to the non-grounded plates of capacitors 30, 31, 32 and 33, respectively.

A further set of choppers 34, 35, 36 and 37 are provided, connected to the non-grounded plates of capacitors 30, 31, 32 and 33, respectively. The operation of this further set of choppers is controlled by a synchro excitation source 38 connected so that choppers 34 and 36 each form a conducting path for half a cycle of source 38 and choppers 35 and 37 each form a conducting path for the remaining half of the cycle. The outputs of choppers 34 and 35 are combined and fed to output terminal 100 via an isolation amplifier 40. Similarly, the outputs of choppers 36 and 37 are combined and fed to output terminal 101 via a further isolation amplifier 101. The described circuit will furnish a square wave output, if a sinusoidal output is required amplifiers 40 and 41 may incorporate a band pass filter.

The operation of the system of FIGURE 1 will now be described. The particular case of producing the appropriate voltages for energizing the stator windings 42 of a synchro will be considered. It will be remembered that the alternating voltages required at terminals 100 and 101 have peak to peak amplitudes in the ratio sin $\theta$:sin ($\theta$+60) to set the synchro rotor to the required position $\theta$. For synchro energization, decoder 21 is adjusted so that the timing signals at terminals 62, 63, 64 and 65 occur at master scaler counts of 0, ½ capacity, ⅙ and ⅔ capacity, respectively.

Consider first the situation where no digital signal has been applied at terminal 10 and scalers 12 and 20 are operating in synchronism. That is, the reference sine wave appearing on conductor 14 completes one cycle at the instant when scaler 20 reaches its maximum count. The timing signals appearing on terminals 62, 63, 64 and 65 occur at instants when the amplitude of the reference sine wave is proportional to sin 0°, sin 180°, sin 60° and sin 240°, respectively. Thus, voltages corresponding to these values are stored on capacitors 30 through 33 when choppers 15 through 18 are actuated by the respective timing signals appearing at terminals 62 through 65.

The stored voltages are, in turn, sampled by choppers 34 through 37 resulting in the output at terminal 100 being zero, in this case, and the output signal at terminal 101 having a peak to peak amplitude proportional to sin 60°. Thus, the appropriate signals to set the synchro rotor shaft to a position which will be arbitrarily denoted as the zero, or reference, position are provided.

As the count in the master scaler 20 completes a cycle and returns to zero, the data entry control 24 operates to increment the count in the master scaler by the amount of the digital signal present at terminal 10. Thus, scalers 12 and 20 no longer operate in synchronism and the timing signals are shifted from their previous relationship with the reference sine wave. This situation is shown in FIGURES 3(a) and (b) where FIGURE 3(a) shows the reference sine wave and FIGURE 3(b) shows the timing signals 62', 63', 64' and 65' occurring at terminals 62, 63, 64 and 65, respectively. It will be noted that in time sequence the timing signal at terminal 64 occurs before the timing signal at terminal 63. For the particular seqeunce of timing signals assumed in the previous paragraph the timing signals occur when the reference sine wave amplitudes are sin $\theta$, sin ($\theta$+60), sin ($\theta$+180) and sin ($\theta$+240). The relative displacement $\theta$ between the reference sine wave and the timing signals may be expressed as $n/N360$ where N is the scaler capacity and (N−n) the digital number present at terminal 10 by which the master scaler count has been increased.

The timing signals of FIGURE 3(b) have been given an amplitude proportional to the instantaneous amplitude of the reference sine wave at their occurrence. It is these amplitude values which are stored in the storage capacitors when the sampling or chopping circuits are actuated by the timing signals. Specifically, the values of timing signals 62', 63', 64' and 65' are stored in capacitors 30, 31, 32 and 33, respectively. The voltages stored on capacitors 30 and 31 are then sampled alternately by choppers 34 and 35 at the frequency of source 38 and the sampled voltages combined to give the waveform of FIGURE 3(c). It will be seen that this waveform has a peak to peak amplitude proportional to sin $\theta$ and, after passing through amplifier 40, is available at terminal 100 for connection to the synchro stator. Similarly, the voltages stored on capacitors 32 and 33 are sampled alternately by choppers 36 and 37 and the sampled voltages combined to give the waveform of FIGURE 3(d). This waveform has a peak to peak amplitude proportional to sin ($\phi$+60) and, after passing through isolating amplifier 41, is available at terminal 101 for connection to the synchro stator.

If decoder 21 is arranged so that timing signals 62', 63', 64' and 65' occur at scaler counts of 0, ½ capacity, ¼ capacity and ¾ capacity, respectively, then the signals appearing at terminals 100 and 101 will have peak to peak amplitudes proportional to sin $\theta$ and sin ($\theta$+90), i.e. cos $\theta$. These signals are suitable for energizing the stator windings of a resolver. It will be clear to one skilled in the art that output waveforms having their peak amplitudes related to various trigonometric functions of the input digital signal can be produced by suitable choice of the values of the master scaler count at which the timing signals are produced.

While it is convenient to operate with binary digital signals it will be clear that master scaler 20, decoder 21 and transfer gates 23 may operate on a digital system other than binary without departing from the scope of this invention. The reference sine wave appearing on conductor 14 may be formed from the stable frequency by any convenient means of frequency division. If a scaler is used, as shown in FIGURE 1, there is clearly no requirement that it should be restricted to a binary scaler.

Referring now to FIGURE 2 there is shown a block diagram of the data entry control 24 together with the master scaler 20 and the transfer gates 23. The basic controlling element in the data entry control is a flip-flop 50. The SET output of the flip-flop is connected to the reset and carry-inhibit terminal 26 of scaler 20 by a conductor 53. The RESET output of the flip-flop is connected to the inhibit terminal 27 of transfer gates 23. Thus, when flip-flop 50 is in its RESET position master scaler 20 counts the pulses supplied to terminal 22 from the stable frequency source and transfer gates 23 are inhibited. When the flip-flop switches to the SET position the master scaler is initially reset and, because the inhibit has been removed from transfer gates 23, its count then set to the digital number appearing at terminal 10. Thus, during normal operation of the system flip-flop 50 is in the RESET position. When it is desired to change the relative positions of the reference sine wave and the timing signals by incrementing the master scaler then flip-flop 50 is switched to the SET position.

The stable frequency source, represented by terminal 28, is connected directly to the RESET input of flip-flop 50 and connected via an inverting amplifier 51 to the SET input. The SET input is modified by a steering gate control at terminal 54 so that the flip-flop can be switched to the SET position only when terminal 54 is energized. Terminal 54 is connected to the output of an AND gate 55. AND gate 55 has three inputs connected as follows: one from data entry terminal 25; one from the output of scaler 12, denoted by terminal 29, via a gating pulse circuit 43 and the last from the flip-flop SET output via an inhibit pulse circuit 42. Circuit 42 produces an inhibit pulse, of duration approximately twice the period of the clock signal, in response to flip-flop 50 being switched to the SET position. Circuit 43 produces a gating pulse of duration approximately equal to the period of the clock signal.

When a digital number is available at terminal 10 the external equipment supplying such a number also supplies an enabling signal to terminal 25. When scaler 12 next reaches its maximum count, corresponding to the reference sine wave completing one cycle, the output step appearing at terminal 29 is supplied to gating pulse circuit 43. Since, at this time, there is no inhibit output from the inhibit pulse circuit 42 AND gate 55 is opened and terminal 54 enabled. The next occurring inverted clock pulse from amplifier 51 switches flip-flop 50 to the SET position. As previously discussed, this results in the master scaler count being set to correspond to the digital number appearing at terminal 10.

Flip-flop 50 is switched to the RESET position in the next half cycle of the clock signal and would again be SET by the next inverted clock pulse were it not for the inhibit pulse produced by circuit 42 in response to the previous switching of the flip-flop circuit to the SET position. By the time the inhibit pulse ceases, the gating pulse from circuit 43 has terminated and AND gate 55 cannot open until scaler 12 next completes another full cycle.

Pulse producing circuits 42 and 43 may, typically, be one-shot or astable circuits, however, any other form of suitable pulse producing circuit may be used. As an alternative to the gating pulse circuit in FIGURE 2 the gating pulse may instead be derived from the reference sine wave appearing on conductor 14 by means of a conventional zero crossing detector. To ensure an accurate relationship between the reference sine wave and the count in master scaler 20 it is desirable that the time delay and temperature coefficient of delay of band pass filter 13 be substantially zero.

Typical operating parameters of the system of this invention are as follows: stable frequency source 11, 8.192 mc./s.; scalers 12 and 20, total capacity $2^{13}$ (8,192); synchro excitation source 38, 400 c./s. This results in the reference sine wave frequency being 1 kc./s. For synchro energization the timing signals are produced at master scaler counts of 0, 1365, 4096 and 5461. For resolver energization the timing signals are produced at master scaler counts of 0, 2048, 4096 and 6144.

Thus, there has been described a novel digital to analog converter system. The various components used in this system are, by themselves, well known to one skilled in the art and have not been described in detail. Various substitutions of one known component for another will be within the skill of one knowledgeable in the art and such substitutions are considered to be within the scope of the invention as defined by the appended claims.

I claim:

1. A digital to analog converter responsive to a digital number signal to produce alternating output voltages having peak amplitudes related to trigonometric functions of said digital number comprising,
    a stable frequency signal source,
    a first scaler connected to said source responsive to each cycle of said stable frequency signal uniformly to increment the scaler count,
    a decoding circuit connected to said scaler to produce timing signals at the occurrence of predetermined counts in said scaler,
    means responsive to said digital number signal to increment the count in said scaler by said digital number to shift the time of occurrence of said timing signals by an amount proportional to said digital number,
    a sinusoidal signal source synchronized with said stable frequency source so that said scaler recycles in a time period equal to one cycle of said sinusoidal signal,
    a plurality of first sampling means connected to said decoding circuit and said sinusoidal signal source each responsive to one of said timing signals to sample the amplitudes of said sinusoidal signal at the instants of said timing signals,
    a corresponding plurality of storage means each connected to one of said first sampling means to retain values representative of said sampled amplitudes,
    an excitation signal source,
    a corresponding plurality of second sampling means each connected to said excitation signal source and to one of said storage means and responsive to said excitation signal to produce said alternating output voltages having peak amplitudes proportional to said retained values.

2. A digital to analog converter as defined in claim 1 wherein said timing signals comprise a first timing signal, a second timing signal, a third timing signal and a fourth timing signal occurring at scaler courts of 0, 1/6 capacity, 1/2 capacity and 2/3 capacity, respectively.

3. A digital to analog converter as defined in claim 1 wherein said timing signals comprise a first timing signal, a second timing signal, a third timing signal and a fourth timing signal occurring at scaler counts of 0, 1/4 capacity, 1/2 capacity and 3/4 capacity, respectively.

4. A digital to analog converter as defined in claim 1 wherein said sinusoidal signal source comprises a second scaler in series connection with a band-pass filter, said second scaler having the same total count as said first scaler.

5. A digital to analog converter as defined in claim 1 wherein said digital number is a binary number, said first scaler is a binary scaler having a series of binary stages and said incrementing means is connected in parallel to said binary stages.

6. A digital to analog converter as defined in claim 2 wherein said plurality of storage means comprises a first, a second, a third and a fourth capacitor, said plurality of first sampling means being responsive to said timing signals to momentarily connect said first, second, third and fourth capacitors to said sinusoidal signal on the occurrence of said first, second, third and fourth timing signals, respectively.

References Cited

UNITED STATES PATENTS

| | | | |
|---|---|---|---|
| 3,333,109 | 7/1967 | Updike | 328—151 X |
| 3,142,822 | 7/1964 | Martin | 340—173 |
| 3,011,110 | 11/1961 | Yu-Chi et al. | 318—28 |

MAYNARD R. WILBUR, Primary Examiner

C. R. EDWARDS, Assistant Examiner